US009316352B2

(12) United States Patent
Thorson et al.

(10) Patent No.: US 9,316,352 B2
(45) Date of Patent: Apr. 19, 2016

(54) GREASE GUN INCLUDING A TRIGGER LOCK ASSEMBLY

(71) Applicant: Milwaukee Electric Tool Corporation, Brookfield, WI (US)

(72) Inventors: Troy C. Thorson, Cedarburg, WI (US); Scott D. Eisenhardt, Pewaukee, WI (US); Terry L. Timmons, Milwaukee, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 127 days.

(21) Appl. No.: 14/307,688

(22) Filed: Jun. 18, 2014

(65) Prior Publication Data
US 2014/0291354 A1 Oct. 2, 2014

Related U.S. Application Data

(62) Division of application No. 13/571,816, filed on Aug. 10, 2012, now Pat. No. 8,783,522.

(60) Provisional application No. 61/521,903, filed on Aug. 10, 2011, provisional application No. 61/521,987,
(Continued)

(51) Int. Cl.
*H01H 9/06* (2006.01)
*F16N 5/00* (2006.01)
(Continued)

(52) U.S. Cl.
CPC .. *F16N 5/00* (2013.01); *F16N 3/12* (2013.01); *F16N 11/04* (2013.01); *F16N 29/04* (2013.01); *H01H 9/06* (2013.01)

(58) Field of Classification Search
CPC ............ F16N 5/00; F16N 3/12; F16N 11/04; F16N 29/04; H01H 9/06; H01H 3/20; Y10T 74/20702; Y10T 74/20696; Y10T 74/20098; G05G 5/00; G05G 5/005; G05G 5/08; G05G 5/18

USPC .................. 222/153.13, 256–262; 184/105.2; 74/537; 200/43.16–43.18, 318.1, 325, 200/327
See application file for complete search history.

(56) References Cited

U.S. PATENT DOCUMENTS 275,207 A 4/1883 Hayden
1,339,916 A 5/1920 Boe
(Continued)

FOREIGN PATENT DOCUMENTS

CN 100478604 7/2006
DE 102008014430 9/2008
(Continued)

OTHER PUBLICATIONS

Milwaukee Electric Tool Corporation, "12 Volt Grease Gun," service parts list bulletin, May 2010, 2 pages, catalog No. 2446-20, Brookfield, USA.
(Continued)

*Primary Examiner* — Nicholas J Weiss
(74) *Attorney, Agent, or Firm* — Michael Best & Friedrich LLP

(57) ABSTRACT

An electrical tool includes a trigger lock assembly having a trigger lock member, a detent assembly, and a return spring. The trigger lock member is movable relative to a trigger between a neutral position, in which the trigger is movable between an off position and an on position, a lock-off position, in which the trigger is prevented from moving from the off position, and a lock-on position, in which the trigger is maintained in the on position. The detent assembly is operable to releaseably retain the trigger lock member in each position and includes a recess associated with each position. The detent assembly also includes a projection selectively engageable in one of the recesses to releasably retain the trigger lock member in the associated position, and a biasing member biasing the projection into engagement. The return spring is operable to bias the trigger lock member toward the neutral position.

20 Claims, 20 Drawing Sheets

Related U.S. Application Data filed on Aug. 10, 2011, provisional application No. 61/612,835, filed on Mar. 19, 2012, provisional application No. 61/612,846, filed on Mar. 19, 2012, provisional application No. 61/613,888, filed on Mar. 21, 2012.

(51) Int. Cl.
| | |
|---|---|
| F16N 3/12 | (2006.01) |
| F16N 11/04 | (2006.01) |
| F16N 29/04 | (2006.01) |

(56) References Cited

U.S. PATENT DOCUMENTS

| | | | |
|---|---|---|---|
| 1,926,399 | A | 9/1933 | Nielsen |
| 2,106,217 | A | 1/1938 | Johnson |
| 2,615,598 | A | 10/1952 | Watkins et al. |
| 3,461,556 | A | 8/1969 | Chambers |
| 3,662,136 | A * | 5/1972 | Bienwald .............. H01H 13/62 200/318 |
| 3,718,162 | A | 2/1973 | Dafler et al. |
| 3,938,623 | A | 2/1976 | Winston et al. |
| 3,953,696 | A * | 4/1976 | Reimann ............... H01H 13/62 200/318.1 |
| 3,987,869 | A | 10/1976 | Bowers |
| 4,062,425 | A | 12/1977 | O'Dell et al. |
| 4,082,121 | A | 4/1978 | Sturm et al. |
| 4,106,522 | A | 8/1978 | Manesse |
| 4,113,151 | A | 9/1978 | Brown et al. |
| 4,134,523 | A | 1/1979 | Hansen et al. |
| 4,219,131 | A | 8/1980 | Funderburgh |
| 4,257,540 | A | 3/1981 | Wegmann et al. |
| 4,298,144 | A | 11/1981 | Pressl |
| 4,299,238 | A | 11/1981 | Baidwan et al. |
| 4,331,262 | A | 5/1982 | Snyder et al. |
| 4,445,168 | A | 4/1984 | Petryszyn |
| 4,662,540 | A | 5/1987 | Schroter |
| 4,852,772 | A | 8/1989 | Ennis, III |
| 4,946,077 | A | 8/1990 | Olsen |
| 4,951,848 | A | 8/1990 | Keller |
| 4,978,037 | A | 12/1990 | Schuckmann |
| 4,994,984 | A | 2/1991 | Massimo |
| 5,042,695 | A | 8/1991 | Battegazzore |
| 5,182,938 | A | 2/1993 | Merkel |
| 5,556,009 | A | 9/1996 | Motzko |
| 5,565,770 | A | 10/1996 | Jones |
| 5,713,723 | A | 2/1998 | Hathaway |
| 5,836,364 | A | 11/1998 | Burton |
| 5,884,818 | A | 3/1999 | Campbell |
| 6,135,327 | A | 10/2000 | Post et al. |
| 6,216,822 | B1 | 4/2001 | May et al. |
| 6,274,828 | B1 * | 8/2001 | Chu ....................... H01H 13/08 200/321 |
| 6,555,773 | B1 * | 4/2003 | Broghammer ........... H01H 9/06 200/321 |
| 6,679,352 | B2 | 1/2004 | Gillespie |
| 6,722,530 | B1 | 4/2004 | King et al. |
| 6,834,781 | B1 | 12/2004 | Mueller |
| 6,854,620 | B2 | 2/2005 | Ramey |
| 6,889,872 | B2 | 5/2005 | Herman et al. |
| 7,004,357 | B2 | 2/2006 | Shew |
| 7,032,713 | B2 | 4/2006 | Huang et al. |
| 7,178,700 | B2 | 2/2007 | Song et al. |
| 7,228,941 | B2 | 6/2007 | Weigand et al. |
| 7,249,695 | B2 | 7/2007 | Shew |
| 7,267,198 | B2 | 9/2007 | Cen |
| 7,392,882 | B2 | 7/2008 | Chen |
| 7,476,821 | B1 * | 1/2009 | Knuppel ................ H01H 3/20 200/332.2 |
| 7,523,843 | B2 | 4/2009 | Shew et al. |
| 7,594,622 | B2 | 9/2009 | Witt et al. |
| 7,621,428 | B2 | 11/2009 | Springhorn |
| 7,828,119 | B1 | 11/2010 | Schirado |
| 7,874,464 | B2 | 1/2011 | Prague et al. |
| 7,970,558 | B1 | 6/2011 | Roys |
| 7,997,456 | B2 | 8/2011 | Shew et al. |
| 8,020,727 | B2 | 9/2011 | Herman et al. |
| 8,061,043 | B2 * | 11/2011 | Allen ...................... B27B 9/02 30/388 |
| 8,061,573 | B2 * | 11/2011 | Kramer ................. B25C 1/008 227/130 |
| 8,167,168 | B2 | 5/2012 | Reynolds |
| 8,511,399 | B2 * | 8/2013 | Kunz .................... B25D 17/00 173/170 |
| 8,528,782 | B2 | 9/2013 | Mergener et al. |
| 8,783,522 | B2 | 7/2014 | Thorson et al. |
| 2004/0007598 | A1 | 1/2004 | Barrett |
| 2004/0211576 | A1 | 10/2004 | Milbourne et al. |
| 2005/0242126 | A1 | 11/2005 | Izoe |
| 2006/0060426 | A1 | 3/2006 | Chen |
| 2006/0070812 | A1 | 4/2006 | Eggleton |
| 2006/0108180 | A1 | 5/2006 | Grach et al. |
| 2006/0210409 | A1 | 9/2006 | Summer et al. |
| 2007/0137942 | A1 | 6/2007 | Weems et al. |
| 2008/0017452 | A1 | 1/2008 | Chen |
| 2009/0127288 | A1 | 5/2009 | Keller |
| 2010/0001017 | A1 | 1/2010 | Herman et al. |
| 2010/0175972 | A1 | 7/2010 | Kimata et al. |
| 2011/0308920 | A1 * | 12/2011 | Shi ......................... H01H 9/061 200/43.17 |
| 2012/0055951 | A1 | 3/2012 | Herman et al. |
| 2013/0081903 | A1 | 4/2013 | Alekseyev et al. |
| 2013/0087583 | A1 | 4/2013 | Thorson et al. |

FOREIGN PATENT DOCUMENTS

| | | |
|---|---|---|
| EP | 1174892 | 1/2002 |
| EP | 1666786 | 6/2006 |
| EP | 2199653 | 6/2010 |
| FR | 2626248 | 7/1989 |
| GB | 200041 | 7/1923 |
| GB | 276474 | 9/1927 |
| GB | 366314 | 2/1932 |
| GB | 406371 | 2/1934 |
| GB | 419506 | 11/1934 |
| GB | 744314 | 2/1956 |
| GB | 781158 | 8/1957 |
| GB | 784252 | 10/1957 |
| GB | 1152732 | 5/1969 |
| GB | 1316077 | 5/1973 |
| GB | 1318022 | 5/1973 |
| GB | 2396390 | 6/2004 |
| JP | 57132576 | 8/1982 |
| WO | WO 2013023152 | 2/2013 |

OTHER PUBLICATIONS

Milwaukee Electric Tool Corporation, "M12 Cordless Grease Gun," operator's manual, May 2010, 9 pages, catalog No. 2446-20, Brookfield, USA.

PCT/US2012/050332 International Search Report and Written Opinion dated Dec. 26, 2013.

Notice of Allowance for U.S. Appl. No. 13/572,085 date mailed May 13, 2013 (15 pages).

EP121797310 Extended European Search Report and Written Opinion dated Aug. 6, 2013 (10 pages).

European Patent Office Examination Report for Application No. 12179731.0 dated Mar. 31, 2014 (4 pages).

Partial European Search Report for European Patent Application No. 12179731 dated Feb. 2, 2013 (3 pages).

* cited by examiner

GREASE GUN INCLUDING A TRIGGER LOCK ASSEMBLY

CROSS-REFERENCE TO RELATED APPLICATIONS

This application is a divisional of U.S. patent application Ser. No. 13/571,816, filed Aug. 10, 2012, which claims priority to U.S. Provisional Patent Application No. 61/521,903, filed Aug. 10, 2011, to U.S. Provisional Patent Application No. 61/521,987, filed Aug. 10, 2011, to U.S. Provisional Patent Application No. 61/612,835, filed Mar. 19, 2012, to U.S. Provisional Patent Application No. 61/612,846, filed Mar. 19, 2012, and to U.S. Provisional Patent Application No. 61/613,888, filed Mar. 21, 2012, the entire contents of all of which are hereby incorporated by reference.

This application is related to U.S. patent application Ser. No. 13/572,085, filed Aug. 10, 2012, now U.S. Pat. No. 8,528,782, the entire contents of which are also hereby incorporated by reference.

FIELD

The present invention relates to grease guns and, more particularly, to a grease gun with a trigger lock assembly.

SUMMARY

Grease guns are commonly used in work shops, industry and garages to apply lubricant (e.g., grease) to specific points on a piece of machinery. Grease guns typically include a coupler positioned on the end of a hose that can be fitted to grease fittings or zerks which in turn provide fluid access to specific joints, gears, and other important parts of the machine which the grease gun then pumps lubricant into by way of a manual or powered pump.

In one independent embodiment, a grease gun may generally include a housing defining an air purge opening, and an air purge pin defining an aperture and being positionable within the air purge opening, where the aperture of the pin is not aligned with the air purge opening in a closed position, and where the aperture in the pin is aligned with the air purge opening in an open position to allow flow through the air purge opening.

In some constructions, the housing may define a pin opening communicating with the air purge opening, the pin being movably supported in the pin opening between the closed and positions. The air purge opening extends in a direction, and the pin opening extending transverse to the air purge opening.

The housing includes a first wall defining the air purge opening and a second wall. In some constructions, the pin may include an actuator portion engageable by a user, the actuator portion being located on the second wall and spaced from the air purge opening.

In some constructions, the grease gun may include a biasing member (e.g., a spring) biasing the pin to the closed position. The biasing member may be positioned between a portion of the pin and a portion of the adjacent housing. The pin may include a retainer engageable with the housing to prevent the pin from being removed (e.g., forced by the biasing member) from the housing. The retainer may be positionable (e.g., removable) to allow the pin to be removed from the housing.

Before any independent embodiments of the invention are explained in detail, it is to be understood that the invention is not limited in its application to the details of embodiment and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

DETAILED DESCRIPTION

Figure 1:
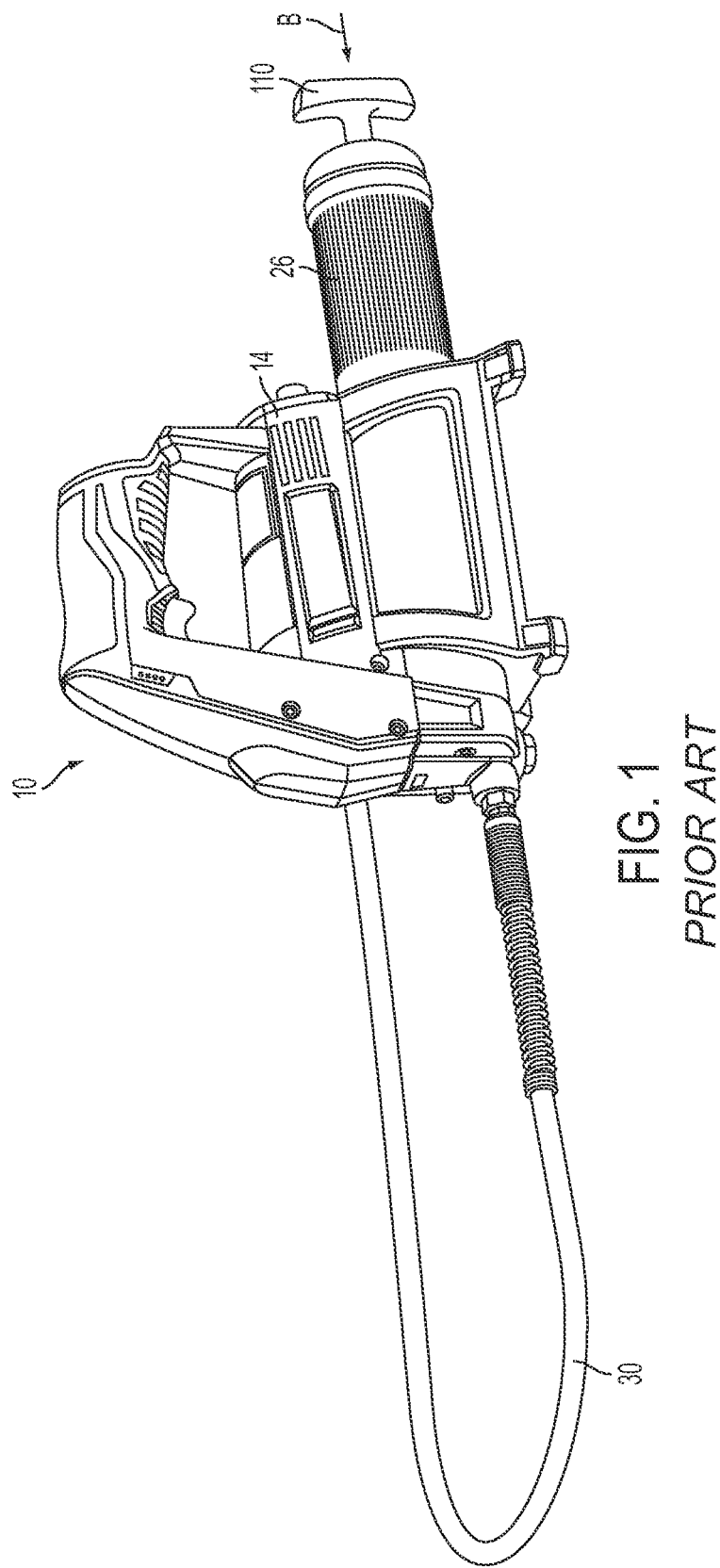
FIG. 1 is a perspective view of a grease gun.
Figure 2:
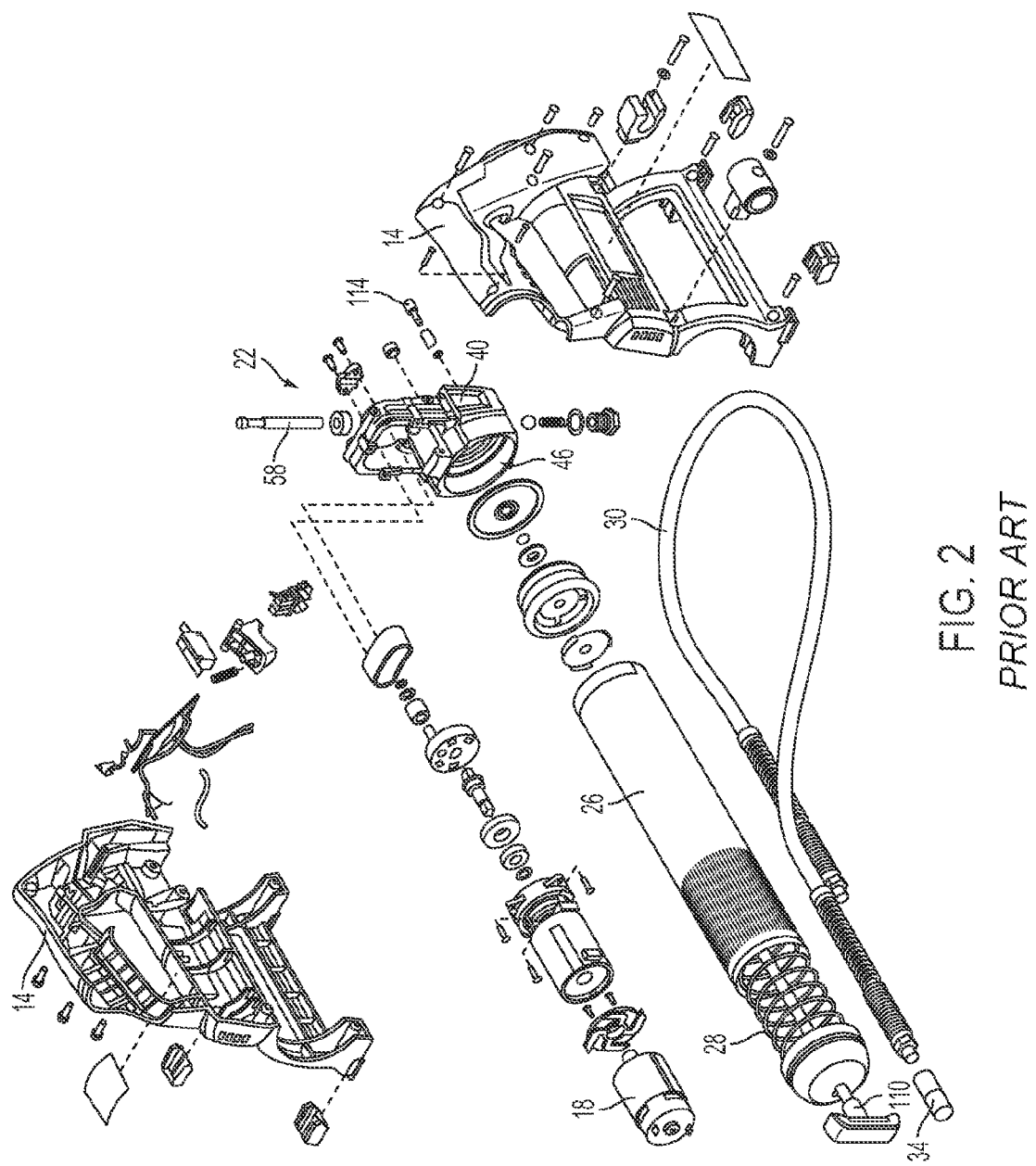
FIG. 2 is an assembly view of the grease gun shown in FIG. 1.

FIGS. 1-2 illustrate an electrically powered grease gun 10. In the illustrated construction, the grease gun 10 includes a housing 14, a motor 18 supported by (e.g., positioned within) the housing 14, a pump assembly 22 driven by the motor 18, a barrel assembly 26 configured to receive a lubricant cartridge (not shown), and an output hose 30 fitted with a coupler 34. Although the illustrated construction is shown with a flexible output hose 30, in alternate constructions (not shown), a rigid output hose may be used.

In the illustrated construction, the motor 18 is powered by an 18 volt battery. However, in other constructions, the motor 18 may be powered by a different electrical power source, such as different battery types, line power (plugged into a wall outlet, a generator) etc. In still other constructions, the motor 18 may be designed for and powered by a different power source, such as a pneumatic power source.

Figure 3:
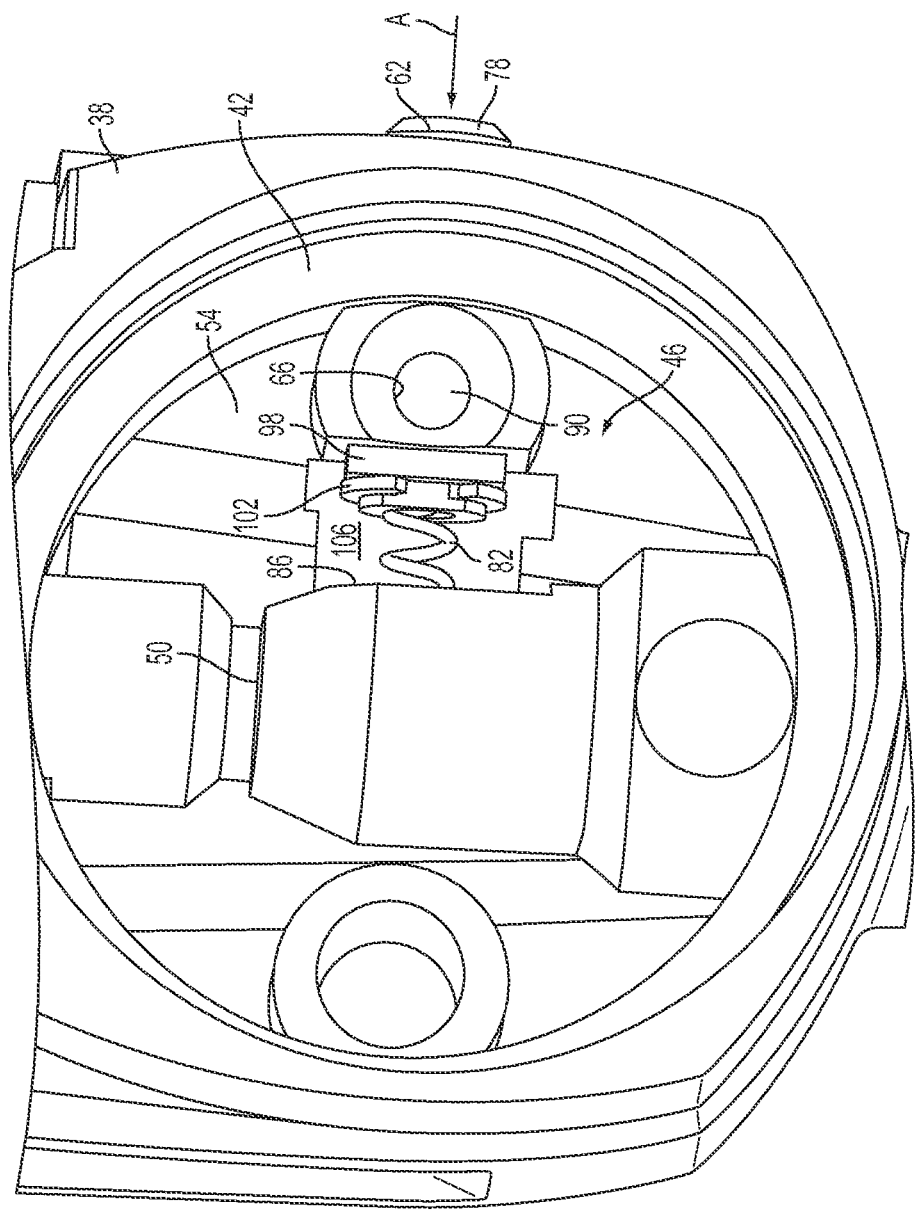
FIG. 3 is a perspective view of a portion of a grease gun and shows a pump housing and an air purge pin with the pin in a closed position.
Figure 4:
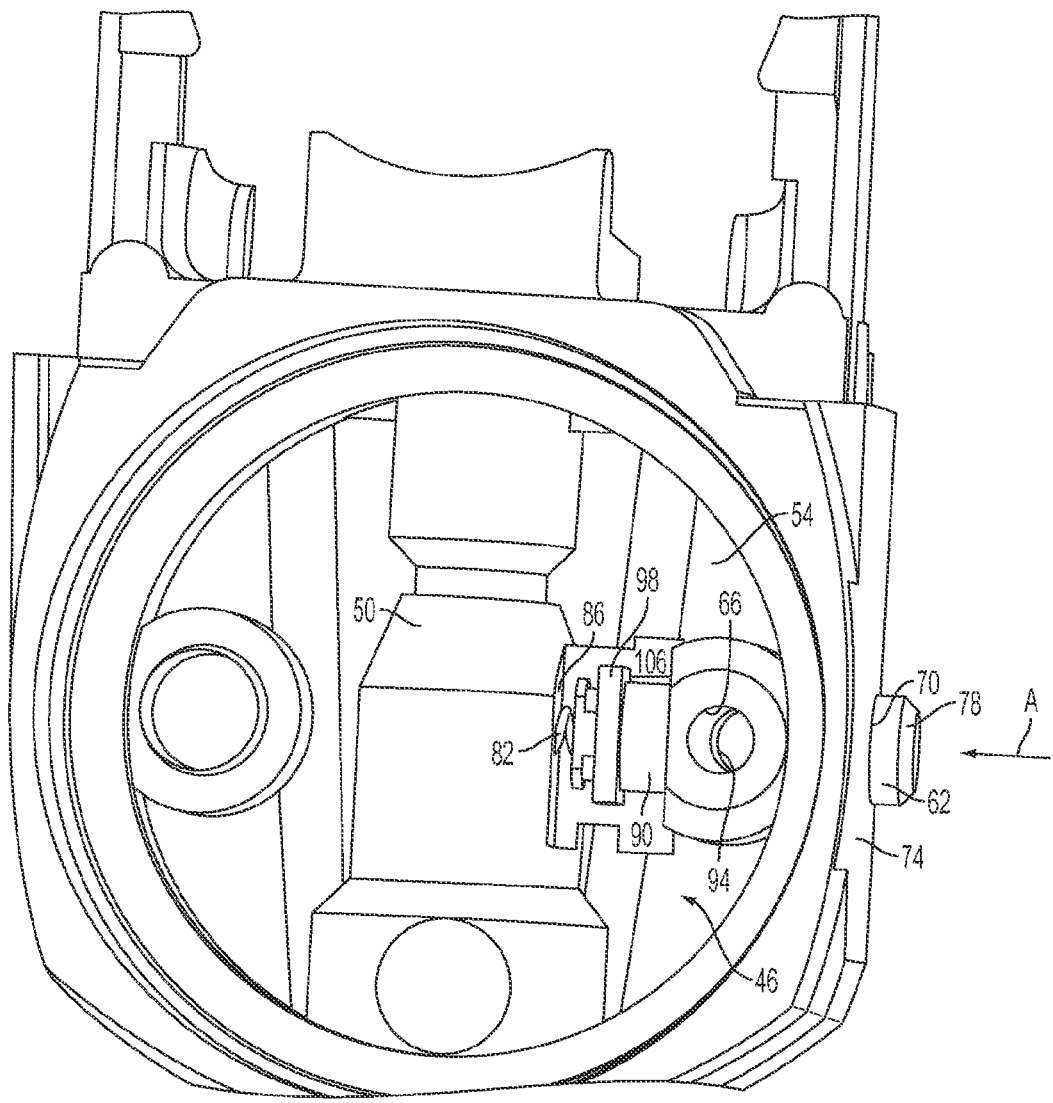
FIG. 4 is a perspective view of the pump housing and the pin with the pin in an open position.
Figure 5:
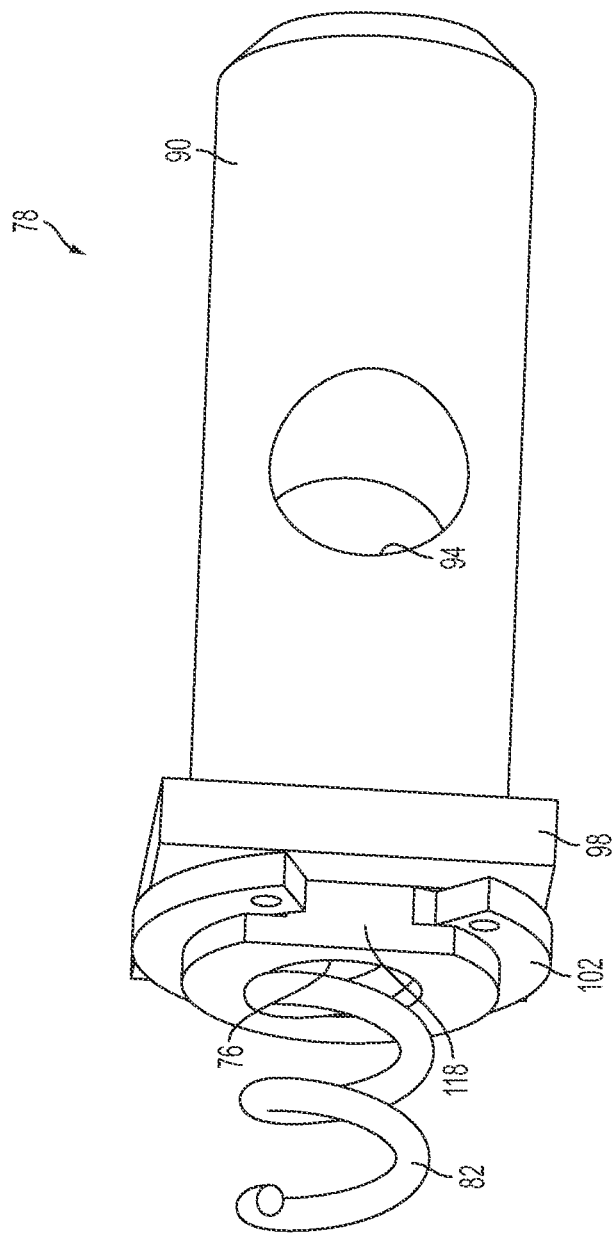
FIG. 5 is a perspective view of the pin, the stop, the retaining ring, and the spring shown in FIG. 4.

FIGS. 3-4 illustrate a pump body 38 configured to replace the pump body 40 illustrated in FIGS. 1-2. When assembled, the pump body 38 is coupled to the housing 14 of the grease gun 10 and acts as a mounting point for the barrel assembly 26. More specifically, the pump body 38 includes a threaded ridge 42 to which the barrel assembly 26 may be releaseably attached defining a storage volume 46 therebetween. For operation, a new or replaceable lubricant cartridge (not shown) is placed within the storage volume 46 to be dispensed from the output hose 30.

The pump body 38 also includes a cylinder 50 extending substantially along the end wall 54 and configured to receive a piston 58. During operation, rotation of the motor 18 causes the piston 58 to reciprocate within the cylinder 54, draw lubricant from the lubricant cartridge and pump it, under pressure, through the output hose 30.

A purge assembly 62 provides selective fluid communication between the storage volume 46 and the surrounding atmosphere. More specifically, the purge assembly 62 includes a first opening 66 extending through the end wall 54 of the pump body 38 and a second opening 70 intersecting the first opening 66. In the illustrated construction, the second opening 70 extending substantially perpendicular to the first opening 66 through an adjacent side wall 74 of the pump body 38. In the illustrated construction, the second opening 70 is open on both ends.

Illustrated in FIGS. 3-7, the purge assembly 62 also includes a pin 78 configured to be at least partially received and move within the second opening 70 between a closed position (see FIG. 3), in which the first opening 66 is blocked by a portion of the pin 78 and the storage volume 46 is not in fluid communication with the surrounding atmosphere, and an open or purge position (see FIG. 4), in which the first opening 66 is not blocked and the storage volume 46 is in fluid communication with the surrounding atmosphere. In the illustrated construction, the pin 78 is biased towards the closed position by a biasing member (e.g., a spring 82) positioned between the pin 78 (e.g., engaging a recess 76 in the end of the pin 78) and a flat 86 formed by the pump body 38.

The pin 78 includes a substantially cylindrical body 90 sized to prevent flow through the second opening 70 in all positions of the pin 78. A seal arrangement (not shown) may also be provided to seal one or both ends of the second opening 70.

Figure 6:
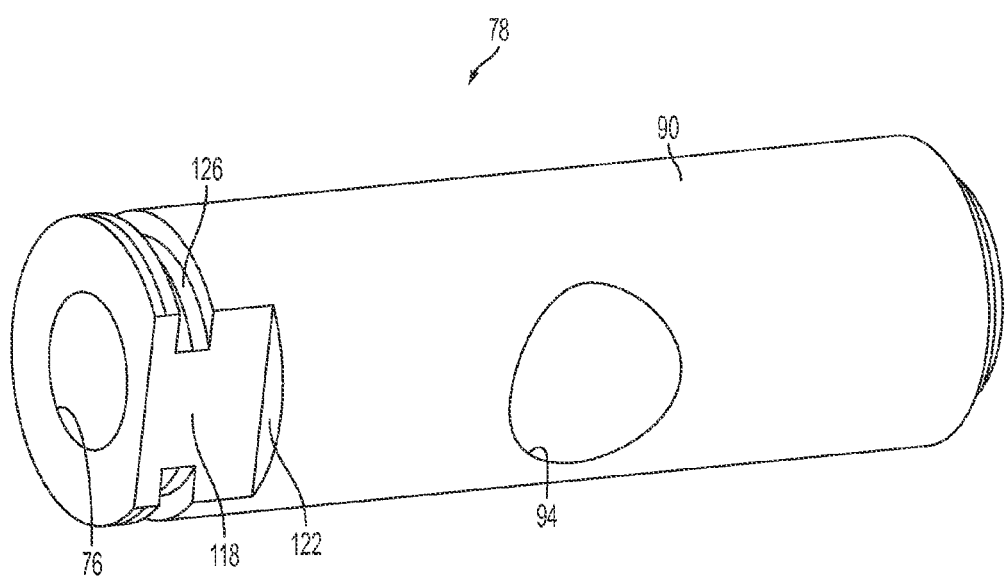
FIG. 6 is a perspective view of the pin shown in FIG. 5.

Illustrated in FIG. 6, the pin 78 also includes a flat surface 118 positioned proximate the inner end of the body 90 to produce a side wall 122. When assembled, the flat surface 118 interacts with a stop 98 (described below). The pin 78 also includes a groove 126 sized to at least partially receive a retaining ring 102 (described below) therein.

An aperture 94 extends transversely through the cylindrical body 90. The aperture 94 is positioned and sized such that, when the pin 78 is in the open position, the aperture 94 at least partially aligns with the first opening 66 to place the storage volume 46 in fluid communication with the atmosphere, and, when the pin 78 is in the closed position, the aperture 94 does not align with the first opening 66. In the closed position, the solid portion of the pin 78 is positioned to block the first opening 66. The degree of alignment of the aperture 94 with the first opening 66 may affect the rate of purging (e.g., complete alignment results in maximum flow, and partial alignment may result in reduced flow).

A stop 98 is fixedly coupled to the pin 78 by a retaining ring 102 positioned in the groove 126 of the pin 78. The stop 98 has a substantially square profile and is configured such that one of the flat surfaces of the stop 98 slides along a flat surface 106 formed by the pump body 38, restricting rotation of the pin 78 within the second opening 70. More specifically, the stop 98 maintains the rotational position of the pin 78 within the second opening 70 so that the axis of the aperture 94 always aligns with the axis of the first opening 70. In the illustrated construction, the stop 98 also acts as a motion limiter, restricting the pin 78 from being forced out of the second opening 70 by the spring 82.

Figure 7:
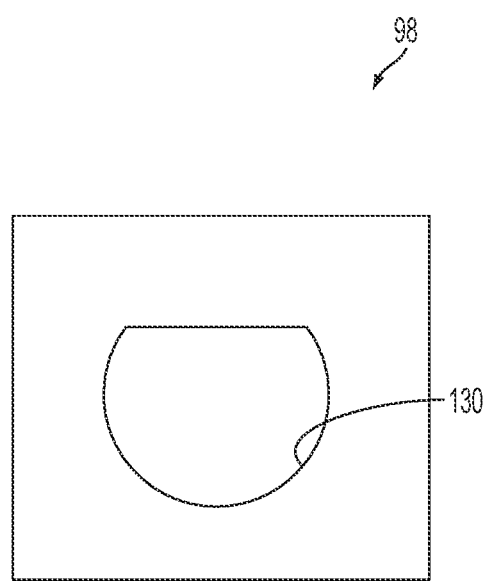
FIG. 7 is an end view of the stop shown in FIG. 5.

Illustrated in FIG. 7, the stop 98 includes an interior aperture 130 that is substantially "D" shaped. When assembled, the stop 98 is introduced axially over the interior end of the pin 78 with the flat portion of the aperture 130 engaging the flat surface 118 of the pin 78, such that the stop 98 and the pin 78 cannot rotate with respect to one another. The stop 98 is axially biased towards the outer end of the pin 78 until it contacts the side wall 122, exposing the groove 126 and allowing the retaining ring 102 to be installed therein, locking the stop 98 in place.

Once installed, the stop 98 is adjustable (e.g., removable) to allow the pin 78 to be removed from the pump body 38 (e.g., for maintenance, disassembly, etc.). To do so, the user first removes the retaining ring 102 and then slides the stop 98 axially off the pin 78, freeing the pin 78 to be removed from the second opening 70. To return the pin 78 to its assembled configuration, the user inserts the pin 78 back into the second opening 70 as described above, and the stop 98 can be re-installed and secured with the retaining ring 102.

During operation, the user utilizes the purge assembly 62 to bleed or purge any air trapped within the storage volume 46, for example, when a new or replacement cartridge of lubricant has been placed within the barrel assembly 26. After the new cartridge has been installed, the user can purge the system by moving the pin 78 (e.g., by pressing on the actuator end of the pin 78) in a purge direction A (see FIGS. 3-4), causing the pin 78 to move from the closed position to the open position, which in turn places the storage volume 46 in fluid communication with the surrounding atmosphere through the aperture 94. The user then advances a plunger 110 in a direction B (see FIG. 1), forcing the air out of the storage volume 46 until grease begins to emerge from the first opening 66. The user then releases the pin 78, and the spring 82 biases the pin 78 to return to the closed position, sealing the storage volume 46 from the surrounding atmosphere. The user may then operate the grease gun 10.

In prior air purge assemblies (see, for example, FIG. 2), the pin 114 is positioned in and moved axially in the air purge opening (not shown). With this prior arrangement, the pin 114, even in the open position, interferes with the flow of air/grease attempting to escape.

In contrast, in the present arrangement, the aperture 94 and the first opening 66 are opened without interference (there is no structure positioned in the pathway created by the aperture 94 and the first opening). The present design may also allow a user to control of the rate of purging by selectively partially aligning the aperture 94 and the first opening 66.

Also, in the prior arrangement (with the pin 114 positioned in the air purge opening), the user's finger may also at least partially block the air purge opening impeding air/grease escaping the system and/or resulting in grease getting on the user's fingers. In contrast, in the present design, the user's fingers when engaging the pin 78 are not positioned near the air purge opening (the aperture 94 and the first opening 66).

In another embodiment (not shown), the pin 78 may be configured to rotate about it's axis between the open position, in which the axis of the aperture 94 is aligned with the axis of the first opening 66, and the closed position, in which the axis of the aperture 94 is at an angle with respect to the axis of the first opening 66. The user would rotate the pin 78 generally 90 degrees from the open position to the closed position so the axis of the aperture 94 is perpendicular the axis of the first opening 66. In such an embodiment, the pin 78 would not move axially within the second opening 70, as described above.

FIGS. 8-13 illustrate an alternate embodiment of a portion of a grease gun including a pump body 38' and a purge assembly. The illustrated alternate embodiment includes much of the same structure and has many of the same properties as that illustrated in FIGS. 3-7. Common elements have been given the same reference numbers "'". The following description focuses primarily upon structure and features of the alternate embodiment that differ from those discussed above.

Figure 8:
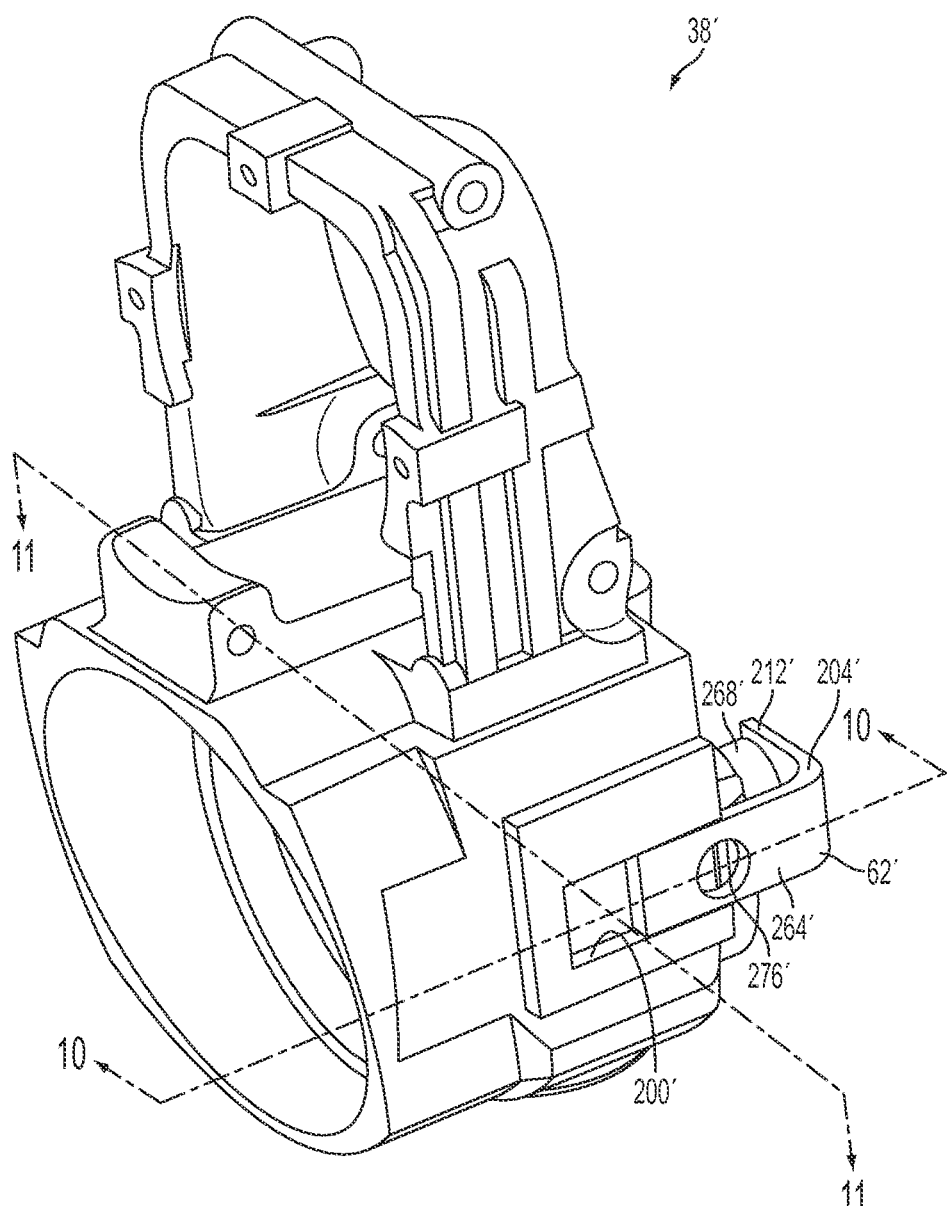
FIG. 8 is a perspective view of a portion of another embodiment of a grease gun and shows a pump housing and a purge assembly with the purge assembly in a closed condition.
Figure 9:
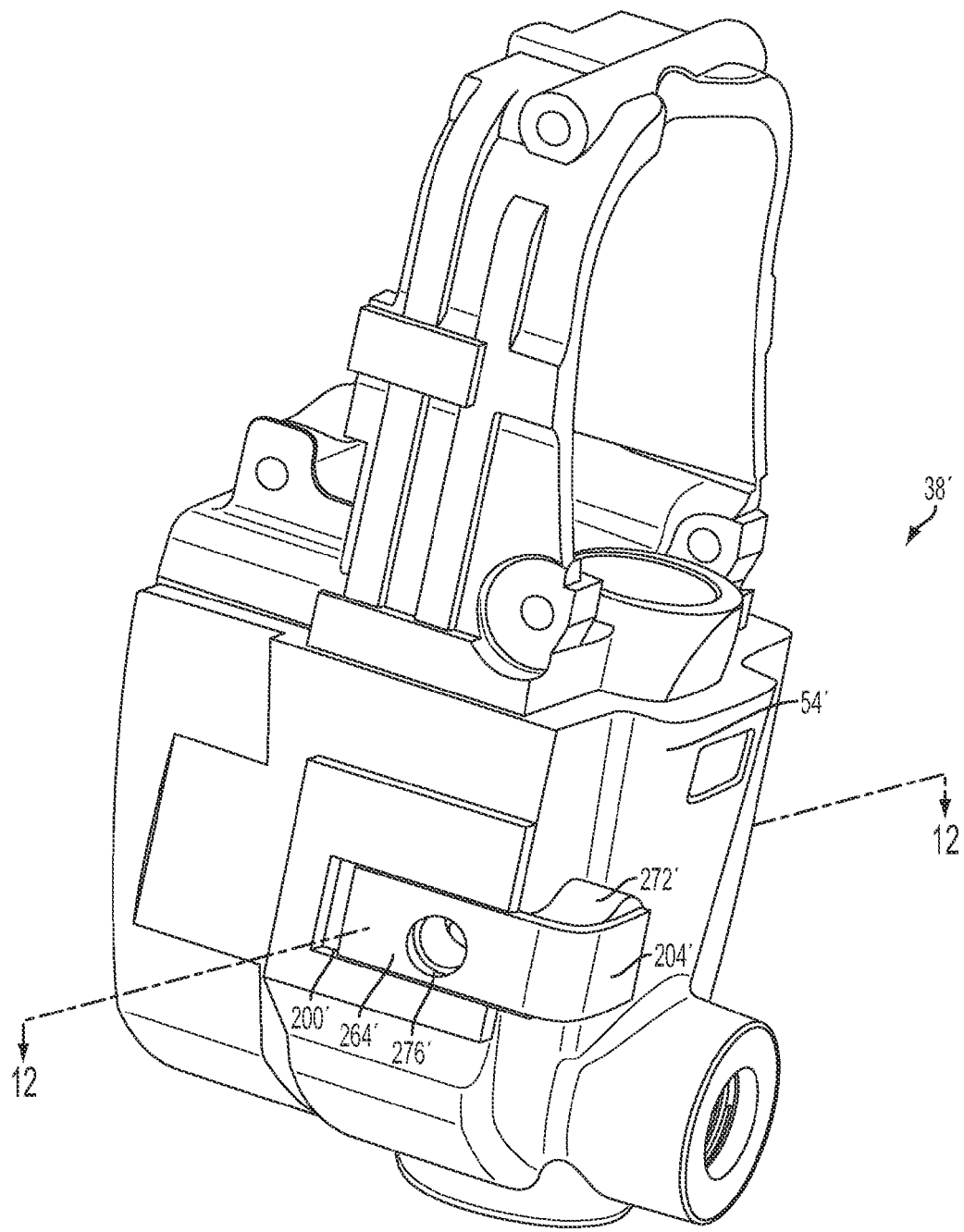
FIG. 9 is another perspective view of the portion of the grease gun shown in FIG. 8 with the purge assembly in an open condition.
Figure 10:
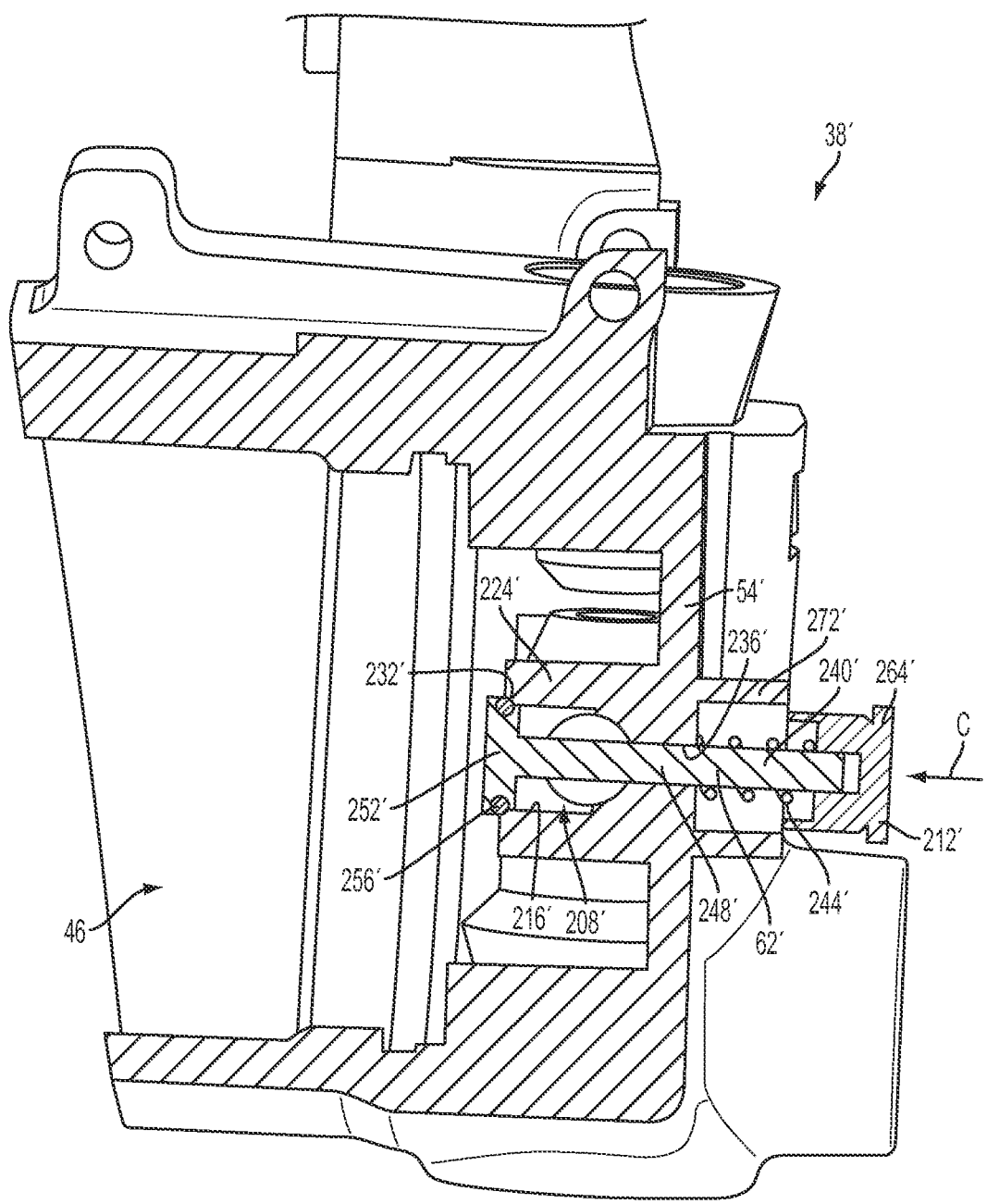
FIG. 10 is a section view taken generally along line 10-10 in FIG. 8.
Figure 11:
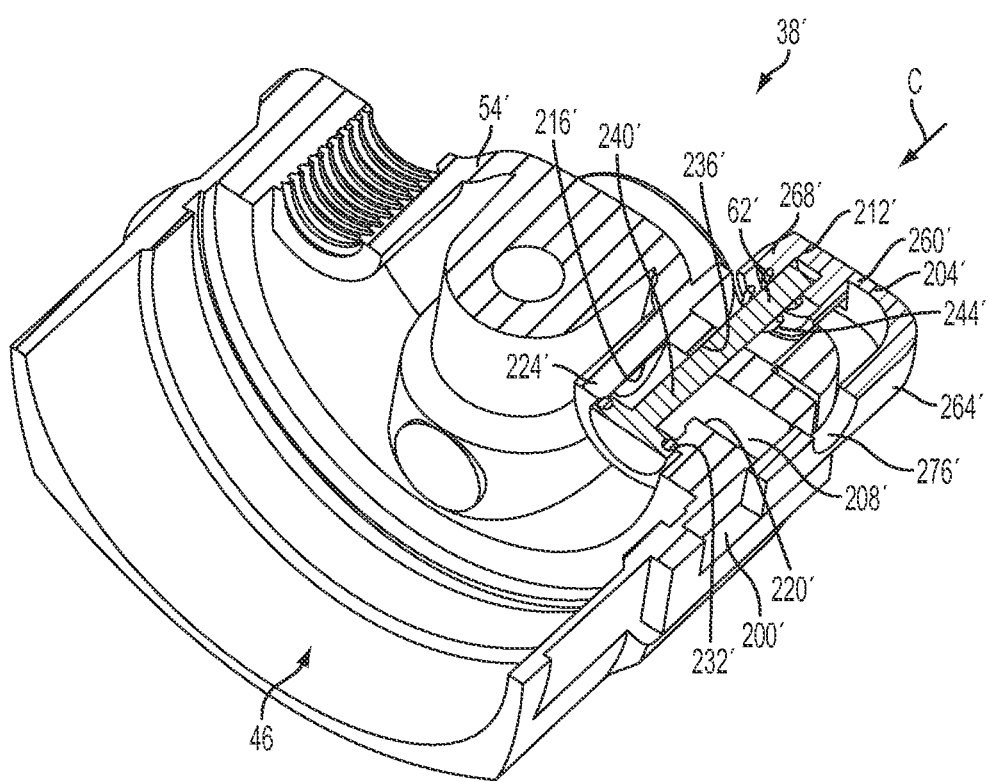
FIG. 11 is a section view taken generally along line 11-11 in FIG. 8.
Figure 12:
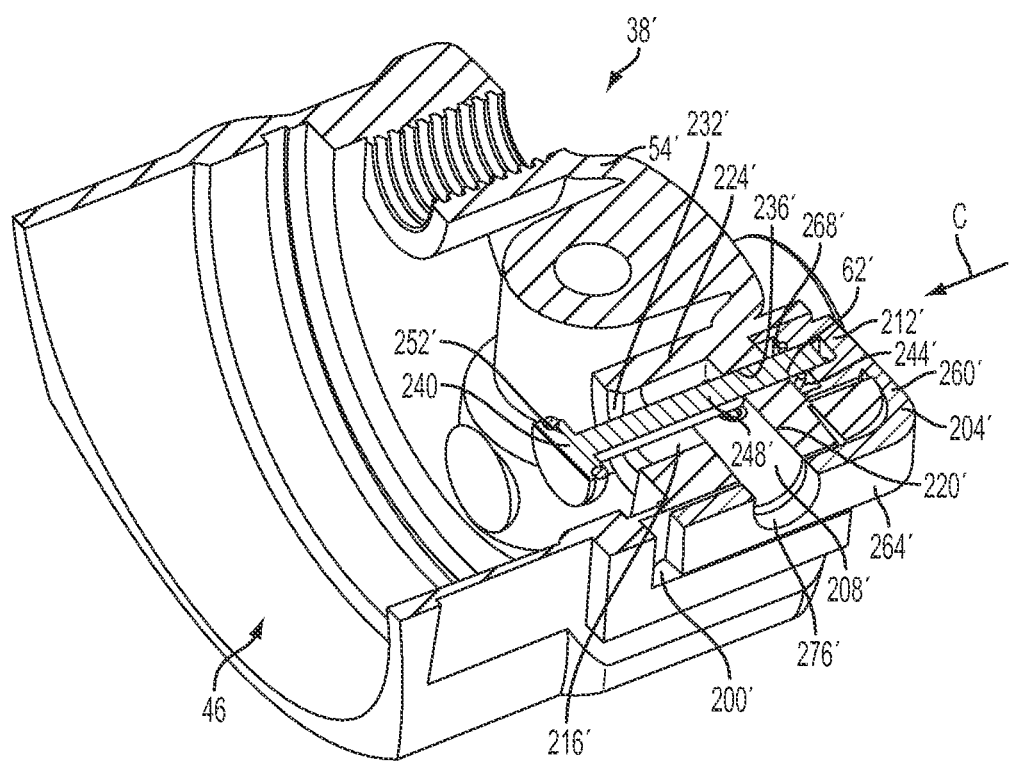
FIG. 12 is a section view taken generally along line 12-12 in FIG. 9.
Figure 13:
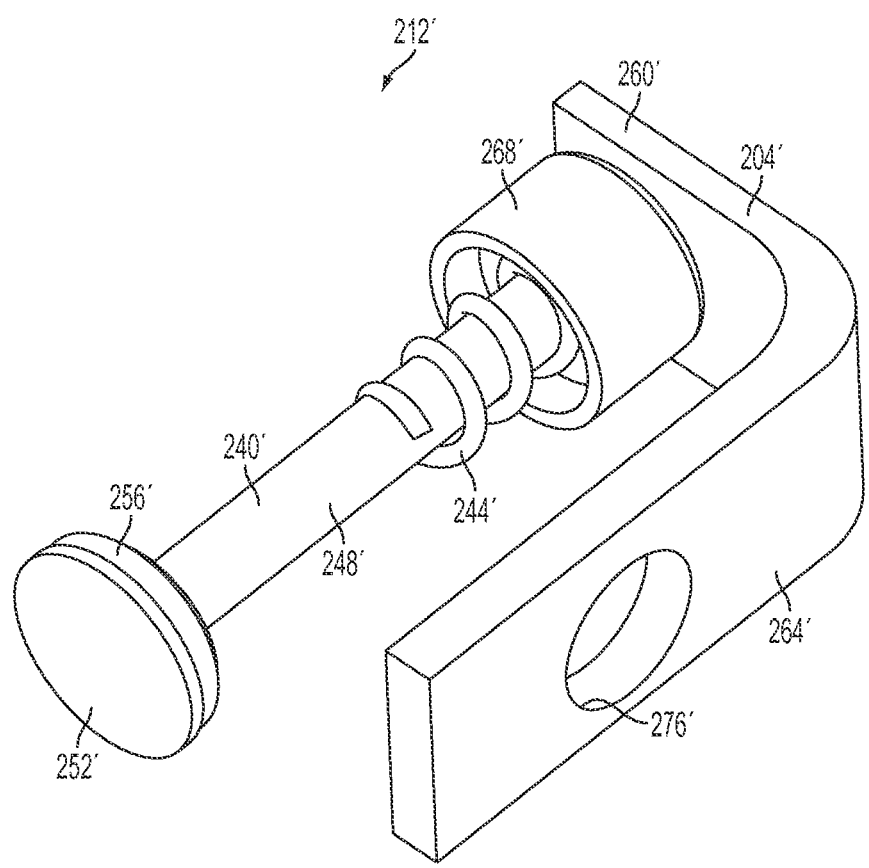
FIG. 13 is a perspective view of the valve assembly shown in FIGS. 10-12.

Illustrated in FIGS. 8-9, the pump body 38' includes a substantially horizontal groove 200 formed in the side of the body. The groove 200 acts as a guide for a portion of a button 204' of the valve assembly 212' (described below), when assembled.

Illustrated in FIGS. 8-13, the purge assembly 62' includes a channel 208' formed by the pump body 38' and a valve assembly 212' positioned within the channel 208'. The valve assembly 212' provides selective fluid communication between the storage volume 46 and the surrounding atmosphere.

The channel 208' includes a first portion 216', extending substantially perpendicular the end wall 54', and a second portion 220' extending perpendicularly from the first portion 216' to the outside of the pump body 38', generally terminating proximate the side of the pump body 38'. The first portion 216' of the channel 208' includes an annular wall 224' extending inwardly from the end wall 54' to produce a distal end 228' and a seat 232'. The seat 232' is shaped to form a seal with the valve assembly 212', when assembled, isolating the storage volume 46 from the surrounding atmosphere.

The channel 208' also includes a recess 236' substantially opposite the distal end 228' of the annular wall 224'. The recess 236' positions the valve assembly 212', when assembled, within the channel 208' while allowing the plunger 240' to move axially therethrough. In the illustrated construction, the recess 236' is sized to create a seal with the plunger 240' and to force escaping grease and air through the second portion 220' of the channel 208'.

The channel 208' is sized such that no external force (e.g., force from the user) is necessary to purge the air and grease from the storage volume 46 when the valve assembly 212' is in the open position. Rather, the illustrated two leg design purges air and grease from the storage volume 46 by pressure from return spring 28 only.

Illustrated in FIGS. 8-13, the valve assembly 212' includes a plunger 240', a button 204' coupled to the plunger 240', and a spring 244'. When assembled, the valve assembly 212' is at least partially positioned within the channel 208' and is adjustable between a closed condition (see FIG. 11), in which the storage volume 46 is isolated from the surrounding atmosphere, and an open condition (see FIG. 12), in which the storage volume 46 is in fluid communication with the surrounding atmosphere. In the illustrated construction, the spring 244' extends between the button 204' and the end wall 54' to bias the valve assembly 212' towards the closed condition.

The plunger 240' includes an elongated stem 248' with an enlarged head 252' at one end. An o-ring 256' extends along the periphery of the head 252' to produce a seal with the seat 232' of the annular wall 224'. When assembled, the plunger 240' moves axially within the first portion 216' of the channel 208' between a closed position, in which the o-ring 256' is seated against the seat 232' (see FIG. 10), and an open position, in which the head 252' is spaced a distance from the annular wall 224' to allow fluid (e.g., air and/or grease) to pass therebetween (see FIG. 12).

Illustrated in FIGS. 8-13, the button 204' is coupled to the stem 248' of the plunger 240' opposite the head 252' and is positioned outside the pump body 38'. During operation, the user manually presses the button 204' in a direction C (see FIGS. 10-12) to adjust the valve assembly 212' from the closed condition toward the open condition.

The button 204' is substantially "L" shaped and includes a first leg 260', coupled to the stem 248' of the plunger 240', and a second leg 264,' at least partially received within and slidable along the groove 200' of the pump body 38'. The button 204' also includes a cylindrical protrusion 268' extending from the first leg 260' to be received within a boss 272' formed on the pump body 38'. When assembled, the protrusion 268' at least partially positions the button 204' in axial alignment with the first portion 216' of the channel 208' while allowing the button 204' to translate axially.

Figure 14:
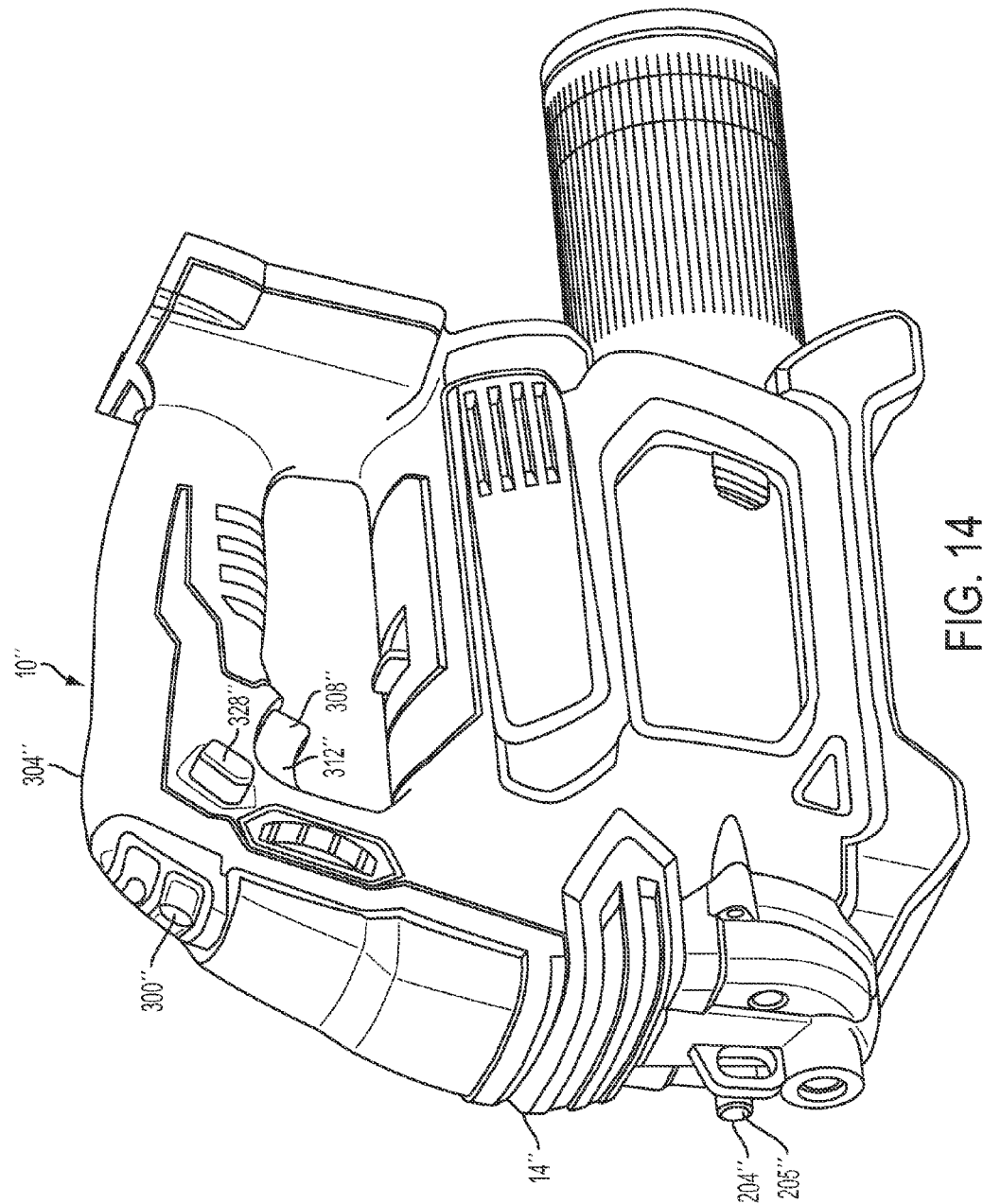
FIG. 14 is a perspective view of another embodiment of a grease gun.
Figure 15:
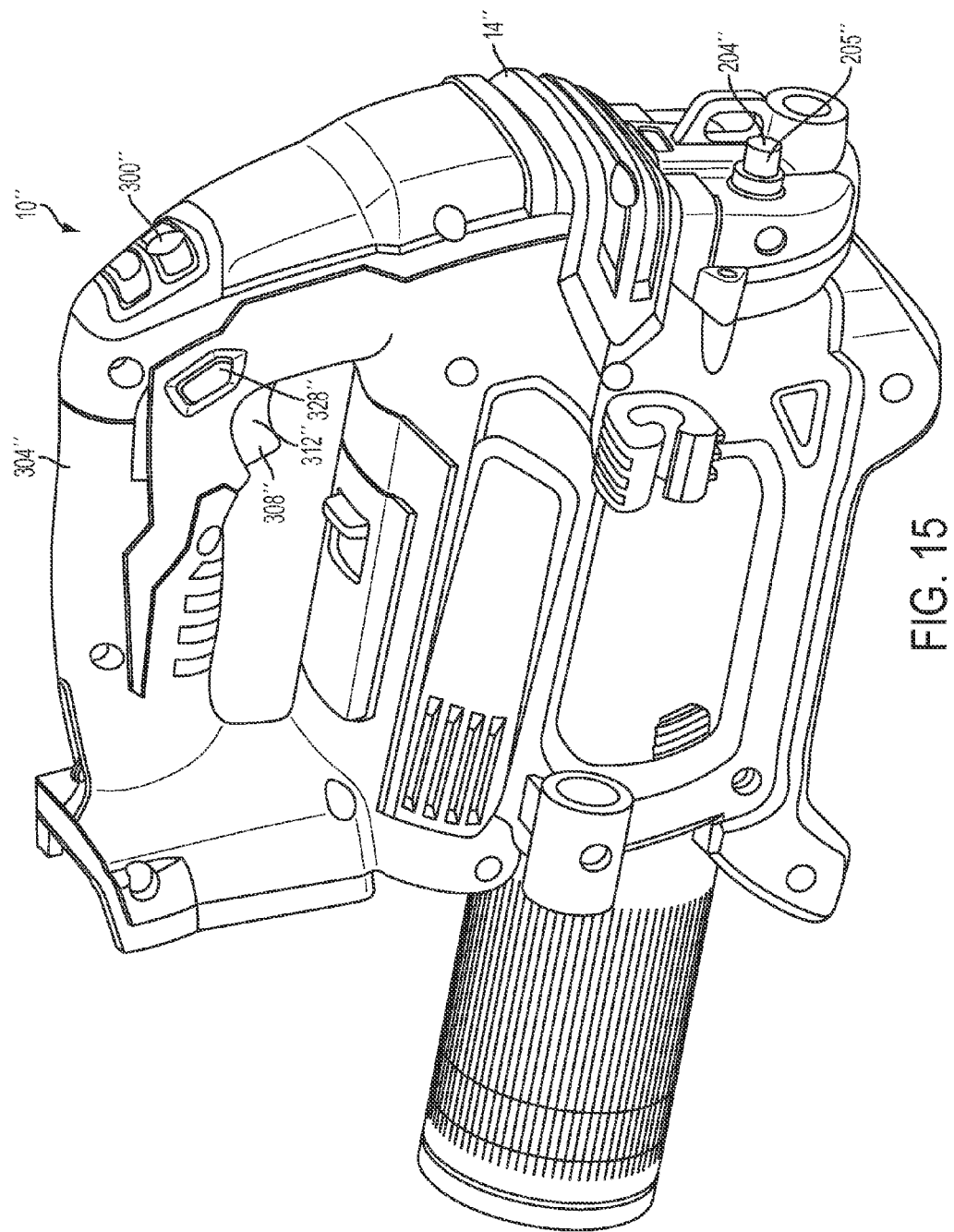
FIG. 15 is a rear perspective view of the grease gun shown in FIG. 14.
Figure 16:
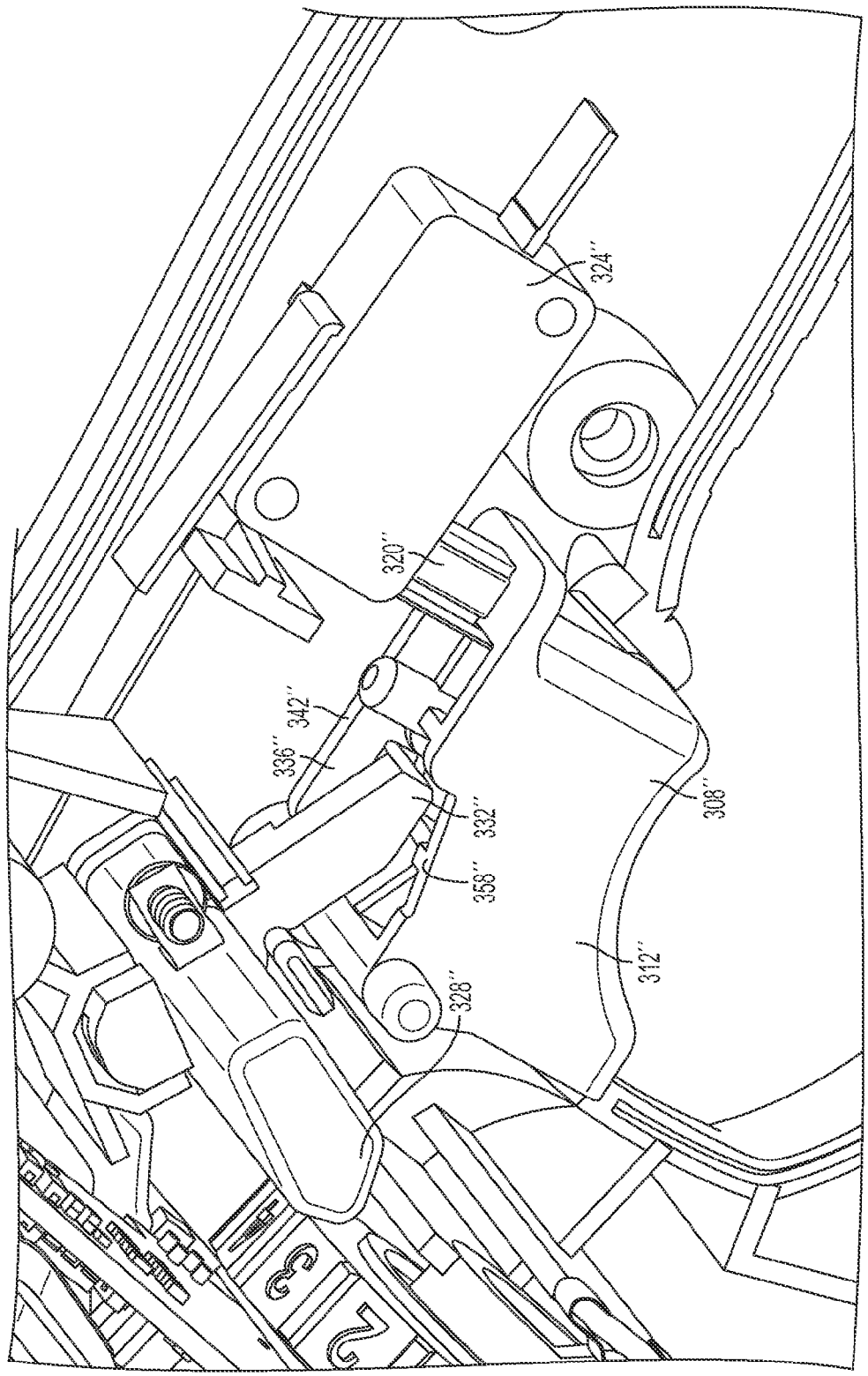
FIG. 16 is a perspective view of the grease gun shown in FIG. 14 with a portion of the housing removed for clarity and illustrating the locking element in a locked position.
Figure 17:
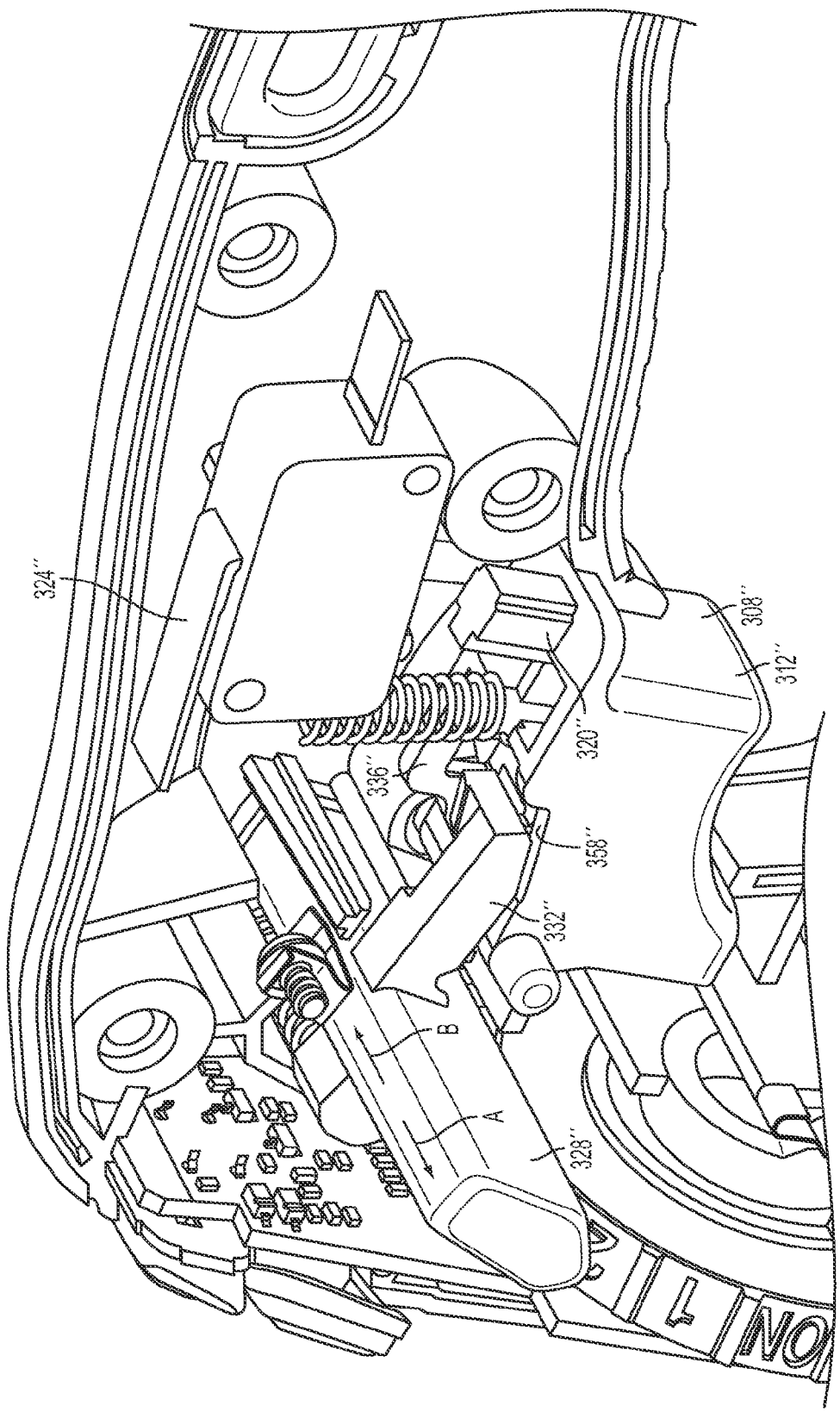
FIG. 17 is a perspective view of the portion of the grease gun shown in FIG. 16 and illustrating the locking element in an unlocked position.
Figure 18:
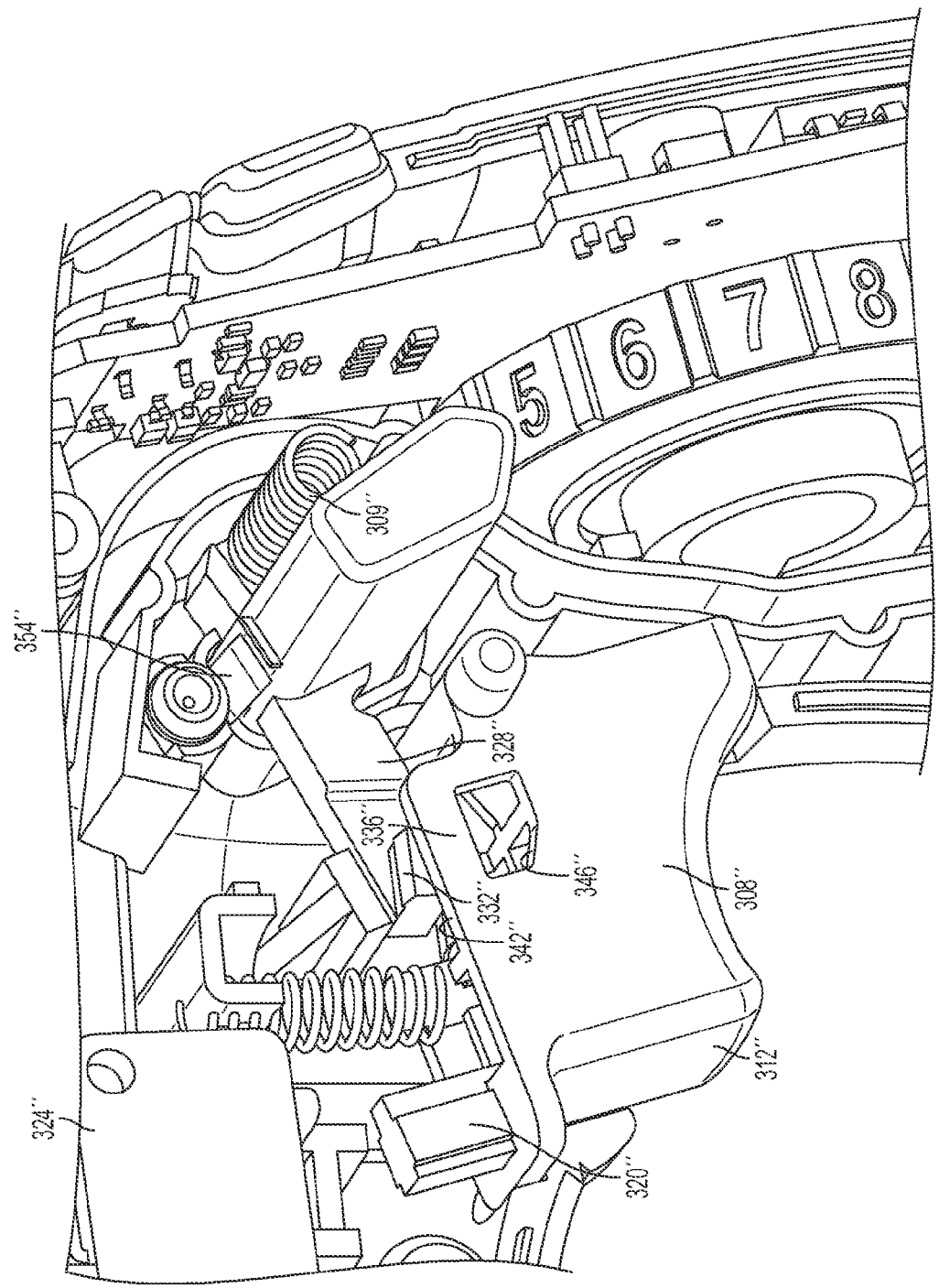
FIG. 18 is a rear perspective view of the grease gun shown in FIG. 14 with a portion of the housing removed for clarity and illustrating the trigger in an off position.

In alternate embodiments (see FIGS. 14-15), the button 204" may include a cap 205" coupled to the stem of the plunger. In such embodiments, the button 204" does not include a second leg (such as the second leg 264').

The button 204' defines an aperture 276' in the second leg 260' sized to correspond with the second portion 220' of the channel 208'. When assembled, the aperture 276' is positioned such that it aligns with the channel 208' when the valve assembly 212' is in the open position (see FIG. 9) and not aligned with the channel 208' when the valve assembly 212' is in the closed position (see FIG. 8). As such, the second leg 264' of the button 204' shields the channel 208' from the outside elements when the button 204' is in the closed position. When the button 204' moves from the open position to the closed position, the edge of the aperture 276' acts as a shear, separating the purged grease from the device 10 so it can be more easily discarded without requiring the user to physically touch the grease.

During operation, the user utilizes the purge assembly 62' to bleed or purge any air trapped within the storage volume 46, for example, when a new or replacement cartridge of lubricant has been placed within the barrel assembly 26'. After the new cartridge has been installed, the user can purge the system by pressing the button 204' in the direction C, causing the valve assembly 212' to be adjusted from the closed condition to the open condition, which in turn places the storage volume 46 in fluid communication with the surrounding atmosphere through the channel 208'. More specifically, when the user depresses the button 204', the head 252' of the plunger 240' is moved away from the seat 232' (described above), and the aperture 276' of the button 204' is placed in alignment with the channel 208'.

The user then advances the plunger 110 in a direction B (see FIG. 1), forcing the air out of the storage volume 46 until grease begins to emerge from the channel 208'. The user then releases the button 204', and the spring 244' biases the valve assembly 212' to return to the closed condition, sealing the storage volume 46 from the surrounding atmosphere and shearing off the purged grease. The user may then operate the grease gun 10.

FIGS. 15-20 illustrate an alternate embodiment of a grease gun 10". The illustrated alternate embodiment includes much of the same structure and has many of the same properties as the embodiments illustrated in FIGS. 1-13. Common elements have been given the same reference numbers """. The following description focuses primarily upon the structure and features of the alternate embodiment that differ from those discussed above Illustrated in FIG. 15, the grease gun 10" includes an illumination device or LED 300". The LED 300" is positioned within the handle portion 304" of the housing 14" such that the LED's light beam is directed toward a work area (e.g., slightly upwardly). During operation, the LED is controlled from a switch (not shown) that is operated independently from the trigger 308". In alternate embodiments, the LED may be turned on and off by the trigger 308".

Figure 19:
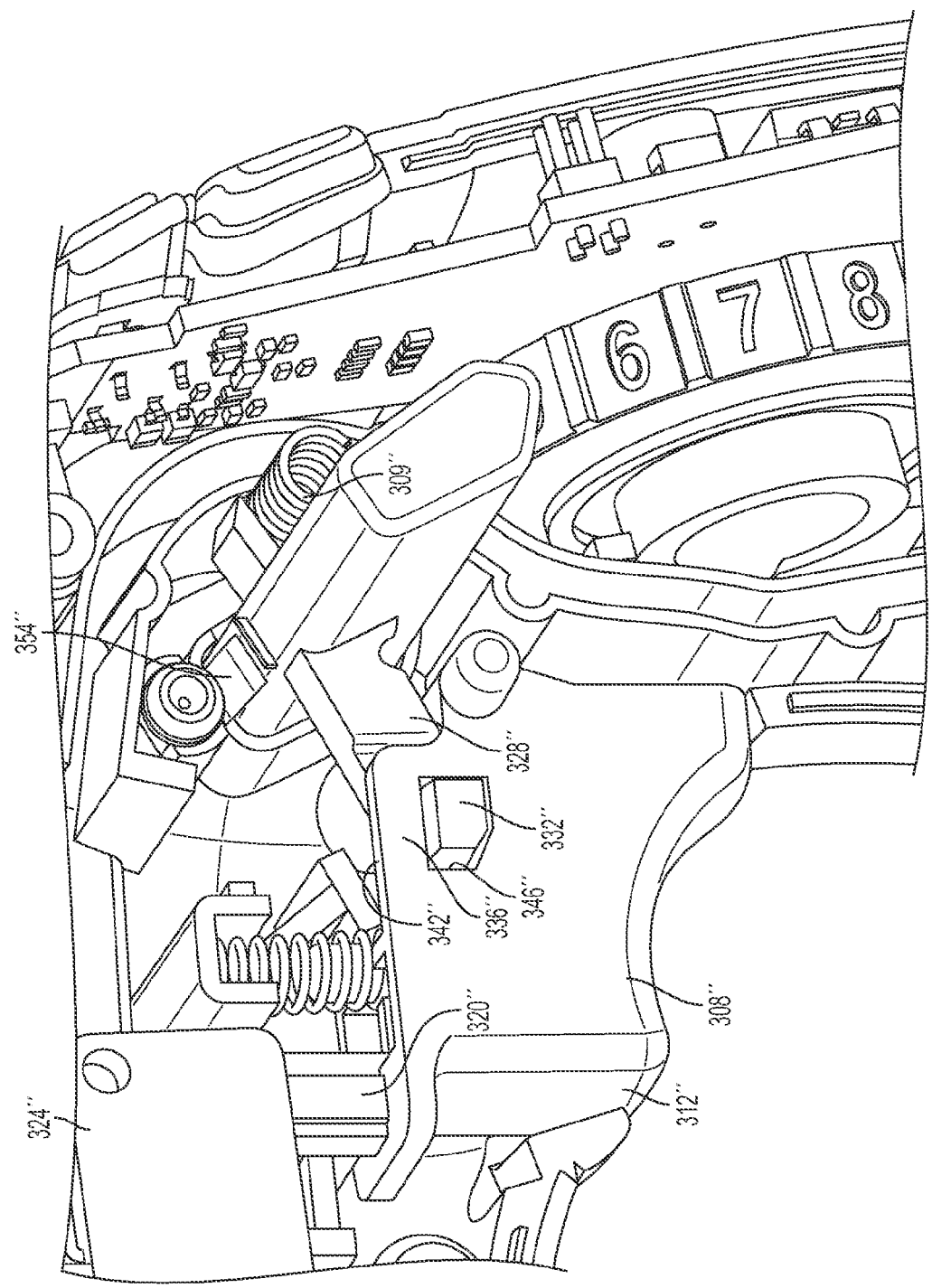
FIG. 19 is a rear perspective view of the portion of the grease gun shown in FIG. 18 and illustrating the trigger in an on position.
Figure 20:
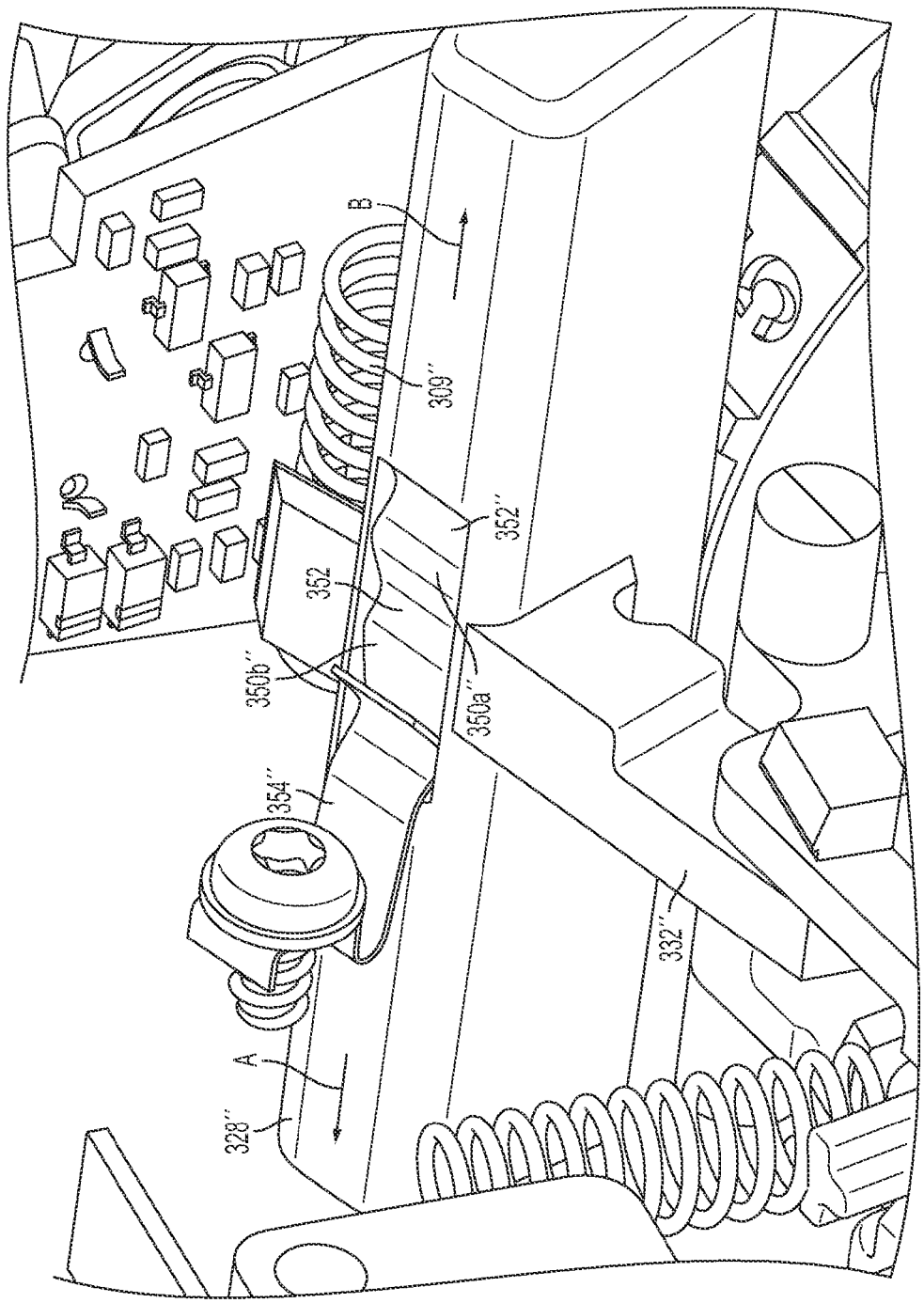
FIG. 20 is a detailed view of a trigger lock of a trigger assembly.

Illustrated in FIGS. 16-20 the grease gun 10" also includes a trigger assembly 312" coupled to the housing 14" and configured to activate and deactivate the motor of the grease gun 10". The trigger assembly 312" includes a trigger 308", pivotably coupled to the housing 14" and movable between a rest or off position (FIG. 18) and an activated or on position (FIG. 19). During operation, the user pivots the trigger 308" (generally against a return spring) from the off position toward the on position to activate the motor and dispense grease. More specifically, pivoting the trigger 308" toward the on position causes a protrusion 320" to contact an electrical switch 324" to supply electrical power from the battery (not shown) to the motor.

The trigger assembly 312" also includes a trigger lock 328". The trigger lock 328" includes an elongated element that is linearly movable with respect to the housing 14" between a neutral position, in which the trigger 308" is able to rotate between the on and off positions, a lock-off position (FIG. 17), in which the trigger 308" is locked in the off position, and a lock-on position (FIG. 19), in which the trigger 308" is maintained in the on position. More specifically, the trigger lock 328" can be moved from the neutral position to the lock-off position by sliding the trigger lock 328" in a first direction A when the trigger 308" is in the off position. Furthermore, the trigger lock 328" can be moved from the neutral position to the lock-on position by sliding the trigger lock 328" in a second direction B opposite the first direction A when the trigger 308" is in the on position. In the illustrated construction, the trigger lock 328" is biased in the first direction A (e.g., toward the lock-off position) by a biasing member or spring 309".

The trigger lock 328" also includes (see FIG. 20) a set of ridges 350" which define detent recesses 352" therebetween. The recesses 352" are engaged by a spring member 354" providing a detent projection to selectively maintain the trigger lock 328" in each of its three positions (described above). In the illustrated construction, the first detent ridge 350a" extends higher than the second detent ridge 350b". As such, the return spring 309" is able to bias the trigger lock 328" from the lock-on position to the neutral position (over the second detent ridge 350b") but is not able to bias the trigger lock 328" from the neutral position to the lock-off position (over the first detent ridge 350a"). Therefore, the user must manually overcome the first detent 350a" to place the trigger lock 328" in the lock-off position.

In the illustrated embodiment, the trigger lock 328" also includes a hook 332" extending therefrom. When the trigger lock 328" is in the lock-off position, the hook 332" contacts the top edge 358" of the trigger 308" and restricts pivoting movement of the trigger 308" from the off position toward the on position. When the trigger lock 328" is in the neutral position, the hook 332" does not contact the trigger 308" so that the trigger 308" is free to move between the on and off positions.

When the trigger lock 328" is moved to the lock-on position, the hook 332" is at least partially received within an aperture 346" formed by the trigger 308". As such, the trigger 308" cannot return to the off position from the on position. During use, if the user wishes to lock the trigger 308" in the on position, the user must first manually activate the trigger 308", moving it from the off position to the on position. Once the trigger 308" is in the on position, the user manually moves the trigger lock 328" from the neutral position to the lock-on position, against the force of the return spring 309". The user then removes pressure from the trigger 308".

To return the trigger 308" to the off position, the user re-applies pressure to the trigger 308", at which point the return spring 309" will automatically move the trigger lock 328" to the neutral position. The trigger 308" then returns to the off position automatically when pressure is released.

In an alternate construction, the trigger lock 328" may be movable between a lock position and an unlock position. When the trigger lock 328" is in the lock position, the trigger 308" cannot be pivoted with respect to the housing 18", and, when the trigger lock 328" is in the unlock position, the trigger 308" is free to pivot between the off and on positions.

More specifically, when the trigger 308" is in the off position, the hook 332" contacts the top 342" of the lock element 336". In contrast, when the trigger lock 332" is in the unlocked position, the hook 332" is at least partially received within an aperture 346" formed by the lock element 336" when the trigger 308" is in the on position. As such, the trigger lock 328" operates when the trigger 308" is in both the on and off positions. The trigger lock 328" can be used both to stop the trigger 308" from being pivoted from the off position toward the on position (e.g., to prevent accidental activation of the grease gun 10") as well as to lock the trigger 308" in the on position (e.g., for prolonged use). In some embodiments, the trigger lock 328" may be spring loaded or biased towards the unlocked position. In such embodiments, when the trigger 308" is locked in the on position, the user can further depress the trigger 308" causing the trigger lock 332" to automatically return to the unlocked position, freeing the trigger 308" to be pivoted with respect to the housing 14".

Although the invention has been described in detail with reference to certain independent embodiments, variations and modifications exist within the scope and spirit of one or more independent aspects of the invention as described.

We claim:
1. An electrical tool comprising:
a housing;
a motor supported by the housing;
a trigger movable between an on position, in which the motor is in electrical communication with a power source, and an off position, in which the motor is not in electrical communication with the power source; and
a trigger lock assembly including
a trigger lock member movable relative to the trigger between a neutral position, in which the trigger is movable between the off position and the on position, a lock-off position, in which the trigger is prevented from moving from the off position, and a lock-on position, in which the trigger is maintained in the on position, a detent assembly operable to releasably retain the trigger lock member in each position, the detent assembly including
  a first recess associated with the neutral position, a second recess associated with the lock-off position, and a third recess associated with the lock-on position,
  a projection selectively engageable in one of the first recess, the second recess, and the third recess to releasably retain the trigger lock member in the associated position, and
  a biasing member biasing the projection and the one of the first recess, the second recess, and the third recess into engagement, and a return spring operable to bias the trigger lock member toward the neutral position.

2. The electrical tool of claim 1, further comprising a lubricant dispenser including a reservoir for containing lubricant and a pump assembly driven by the motor and operable to pump lubricant.

3. The electrical tool of claim 1, wherein the first recess is positioned between the second recess and the third recess.

4. The electrical tool of claim 3, wherein the return spring biases the trigger lock member from the lock-on position toward the neutral position.

5. The electrical tool of claim 4, wherein the detent assembly is configured so that the return spring cannot bias the trigger lock member from the neutral position to the lock-off position.

6. The electrical tool of claim 5, wherein the detent assembly further includes a first ridge between the first recess and the second recess, and a second ridge between the first recess and the third recess, the first ridge having a height greater than a height of the second ridge such that the return spring cannot bias the trigger lock member from the neutral position to the lock-off position.

7. The electrical tool of claim 1, wherein the trigger pivots relative to the housing between the on position and the off position.

8. The electrical tool of claim 1, wherein the trigger lock member is movable in a first direction from the neutral position to the lock-off position and in a second direction opposite the first direction from the neutral position to the lock-on position.

9. The electrical tool of claim 8, wherein the trigger lock member slides linearly relative to the housing between the neutral position, the lock-off position, and the lock-on position.

10. The electrical tool of claim 8, wherein the return spring biases the trigger lock member in the first direction.

11. The electrical tool of claim 10, wherein the detent assembly is configured to allow the return spring to bias the trigger lock member from the lock-on position to the neutral position and inhibit the return spring from biasing the trigger lock member from the neutral position to the lock-off position.

12. The electrical tool of claim 1, wherein the biasing member is a cantilevered spring, and wherein the projection is positioned adjacent a free end of the cantilevered spring.

13. The electrical tool of claim 12, wherein the projection is formed as a single piece with the biasing member.

14. The electrical tool of claim 1, wherein the trigger lock member includes a hook contacting an edge of the trigger to restrict movement of the trigger when in the lock-off position.

15. The electrical tool of claim 14, wherein the hook is received at least partially within an aperture in the trigger to restrict movement of the trigger when in the lock-on position.

16. The electrical tool of claim 1, wherein the return spring automatically moves the trigger lock member from the lock-on position toward the neutral position when pressure is applied to the trigger.

17. A lubricant dispenser comprising:
a housing;
a reservoir for containing lubricant;
a motor supported by the housing;
a pump assembly driven by the motor and operable to pump lubricant;
a trigger movable between an on position, in which the motor is in electrical communication with a power source, and an off position, in which the motor is not in electrical communication with the power source; and
a trigger lock assembly including
  a trigger lock member movable relative to the trigger between a neutral position, in which the trigger is movable between the off position and the on position, a lock-off position, in which the trigger is prevented from moving from the off position, and a lock-on position, in which the trigger is maintained in the on position,
  a detent assembly operable to releasably retain the trigger lock member in each position, the detent assembly including
    a first recess associated with the neutral position, a second recess associated with the lock-off position, and a third recess associated with the lock-on position,
    a projection selectively engageable in one of the first recess, the second recess, and the third recess to releasably retain the trigger lock member in the associated position, and
    a biasing member biasing the projection and the one of the first recess, the second recess, and the third recess into engagement, and
  a return spring operable to bias the trigger lock member toward the neutral position.

18. An electrical tool comprising:
a housing;
a motor supported by the housing;
a trigger movable between an on position, in which the motor is in electrical communication with a power source, and an off position, in which the motor is not in electrical communication with the power source; and
a trigger lock assembly including
  a trigger lock member movable relative to the trigger between a neutral position, in which the trigger is movable between the off position and the on position, a lock-off position, in which the trigger is prevented from moving from the off position, and a lock-on position, in which the trigger is maintained in the on position, the trigger lock member including a hook engaging the trigger to restrict movement of the trigger when in the lock-off position and when in the lock-on position,
  a detent assembly operable to releasably retain the trigger lock member in each position, the detent assembly including
    a first recess associated with the neutral position, a second recess associated with the lock-off position, and a third recess associated with the lock-on position,
    a projection selectively engageable in one of the first recess, the second recess, and the third recess to releasably retain the trigger lock member in the associated position, and a biasing member biasing the projection and the one of the first recess, the second recess, and the third recess into engagement, and a return spring operable to bias the trigger lock member toward the neutral position.

19. The electrical tool of claim 18, wherein the hook contacts an edge of the trigger to restrict movement of the trigger when in the lock-off position.

20. The electrical tool of claim 18, wherein the hook is received at least partially within an aperture in the trigger to restrict movement of the trigger when in the lock-on position.

* * * * *